United States Patent
Atsushi et al.

(10) Patent No.: US 6,669,470 B2
(45) Date of Patent: Dec. 30, 2003

(54) METHOD FOR OPERATING MANUFACTURING EQUIPMENT INCLUDING HEATING FURNACE

(75) Inventors: Masaaki Atsushi, Kobe (JP); Hidetoshi Tanaka, Kobe (JP); Takao Harada, Kobe (JP); Hiroshi Sugitatsu, Kobe (JP)

(73) Assignee: Kobe Steel, Ltd., Kobe (JP)

(*) Notice: Subject to any disclaimer, the term of this patent is extended or adjusted under 35 U.S.C. 154(b) by 0 days.

(21) Appl. No.: 10/196,197

(22) Filed: Jul. 17, 2002

(65) Prior Publication Data

US 2003/0015315 A1 Jan. 23, 2003

(30) Foreign Application Priority Data

Jul. 23, 2001 (JP) ........................................ 2001-221733

(51) Int. Cl.[7] ................................................. F23J 17/00
(52) U.S. Cl. ........................... 432/72; 432/16; 423/210; 110/345
(58) Field of Search .............................. 432/13, 14, 16, 432/28, 72, 196; 423/210; 110/342, 345–348; 122/40

(56) References Cited

U.S. PATENT DOCUMENTS

| | | | | |
|---|---|---|---|---|
| 4,266,967 A | * | 5/1981 | Yamada et al. | 75/479 |
| 4,284,609 A | * | 8/1981 | deVries | 423/243.08 |
| 4,364,910 A | * | 12/1982 | Willett et al. | 423/243.01 |
| 5,951,279 A | * | 9/1999 | Hunold et al. | 432/106 |
| 6,390,810 B1 | * | 5/2002 | Rinker et al. | 432/138 |

FOREIGN PATENT DOCUMENTS

| | | |
|---|---|---|
| JP | 10-337432 | 12/1998 |
| JP | 2001-26426 | 1/2001 |

OTHER PUBLICATIONS

U.S. patent application Ser. No. 10/196,197, Atsushi et al., filed Jul. 17, 2002.
U.S. patent application Ser. No. 10/395,340, Maki et al., filed Mar. 25, 2003.
U.S. patent application Ser. No. 10/396,516, Harada et al., filed Mar. 26, 2003.

* cited by examiner

*Primary Examiner*—Gregory Wilson
(74) *Attorney, Agent, or Firm*—Oblon, Spivak, McClelland, Maier & Neustadt, P.C.

(57) ABSTRACT

A method for operating manufacturing equipment including a heating furnace is provided. The method comprises the step of spraying a blowdown water that has been in the manufacturing equipment into effluent gas discharged from the heating furnace so as to vaporize the blowdown water and remove solid dust contained in the effluent gas. In a plant implementing this method, the amount of the effluent water can be reduced to substantially zero, no purification equipment is required, and solid sludge which has been produced in the purification equipment is thus completely reduced. Moreover, in this method, iron and zinc can be recycled as fly ash which can be easily treated and recycled.

6 Claims, 4 Drawing Sheets

METHOD FOR OPERATING MANUFACTURING EQUIPMENT INCLUDING HEATING FURNACE

BACKGROUND OF THE INVENTION

1. Field of the Invention

The present invention relates generally to a method for operating manufacturing equipment that includes a heating furnace. In particular, the present invention relates to a method for processing blowdown water which has been used in the manufacturing equipment and to a method for cooling effluent gas discharged from the heating furnace.

2. Description of the Related Art

A manufacturing plant uses a plurality of water systems of different usages. For example, a plant for manufacturing reduced iron uses cooling water for indirectly cooling machines in the equipment, hereinafter referred to as the "indirect-cooling water", and cooling water used for direct cooling, which is called process water, hereinafter also referred to as "direct-cooling water". When dehalogenation, dealkalization, or the like is performed, washing water containing alkali or halogen is used. Boiler water is used in a boiler. These waters are usually recycled in the plant because the supply of raw water is limited. Since the water quality of each of these waters is different from another, these waters are processed separately, and the degree of contaminant concentration increases as recycling is repeated. In order to inhibit an increase in the contaminant concentration, blowdown, i.e., draining, is usually performed.

For example, indirect-cooling water does not come into direct contact with objects to be cooled, such as reduced iron, and thus contains relatively small amounts of floating substances such as suspended solids (SS). However, repeated recycling increases the concentration of the dissolved salts in the indirect-cooling water, thereby causing precipitation of salts after the saturated concentration is reached. Moreover, causticity of the water may increase depending on the water quality. Thus, blowdown must eventually be performed to control the contaminant concentration below a predetermined level.

The process water (also referred to as the "direct-cooling water") comes into direct contact with objects to be cooled and thus contains large amounts of floating substances. In recycling the process water, the floating substances are gravitationally settled and removed using a solid-liquid separator utilizing a sedimentation process or the like, and the resulting process water having a reduced floating substance content is recycled. During this process, the blowdown, i.e., draining, of large amounts of floating substances is necessary. In dehalogenation or dealkalization, blowdown for desalting is essential because the concentration of the dissolved salts in the process water is high. As for the boiler water, blowdown is indispensable to prevent accumulation of solid contents and an increase in the concentration of specific components such as alkali and silica.

As described above, blowdown is necessary in nearly all of the water systems.

Generally, in view of overall plant operation, the less the amount of water discharged from the plant, the better. Moreover, the water quality of the discharged water needs to be controlled according to the regulations of the district. Although these regulations differ from one district to another, most of the waters containing floating substances need to be purified by means of coagulation, sedimentation, filtering, or the like, before it is discharged. Sometimes, the purification equipment is shared by a plurality of plants.

Generally, effluent gas from the heating furnace is cooled by some means before the effluent gas is emitted to the atmosphere. For example, the effluent gas may be cooled by the heat exchange with another fluid or by fresh air dilution. However, the effluent gas is frequently cooled by spraying water, since this method is simple and markedly effective.

An example of a method for cooling the effluent gas is shown in FIG. 4. In this method, effluent gas from a rotary hearth furnace for making reduced iron is cooled using sprayed water. In this method, raw water having a suspended solid (SS) concentration of 5 mg/L or less is used as the spray water. The reasons for using raw water are as follows. If water containing floating substances at a high concentration is used as the spray water instead of raw water, the floating substances are also sprayed into the effluent gas. As a result, fly ash of the floating substances is collected by the dust collector, which is a problem. In other words, whereas normal fly ash is processed according to its characteristics, an increase in the amount of fly ash having properties different from normal fly ash is not desirable. Moreover, when water having a high calcium hardness and a high floating substance content is used instead of raw water, scale which may cause clogging of pipes may be produced.

In order to keep the contaminant concentration below a predetermined level, the blowdown water of the indirect-cooling water and the direct-cooling water is discharged from the water systems of the plant. Some items, such as the concentration of the floating substances and the concentration of zinc, in the blowdown water discharged from equipment for manufacturing reduced iron are under effluent control. Normally, the concentration of the floating substances in the effluent is regulated to 200 mg/L or less and a daily average of 150 mg/L or less, and the concentration of zinc is regulated to 5 mg/L or less. More stringent regulations sometimes apply to specific businesses in specific districts. For example, in some districts, the concentration of the floating substances is regulated to 40 mg/L or less for the steel businesses that discharge a large quantity of effluent water.

Direct-cooling water contains large amounts of floating substances and thus purification equipment is often required. The floating substances in the direct-cooling water are collected in the form of solid sludge using the purification equipment. When steel-making dust is used as the stock for making iron, zinc may be introduced into the indirect-cooling water or the direct-cooling water. When the zinc concentration in the blowdown is high, zinc must be removed to satisfy the effluent regulation. Examples of known methods for removing zinc include a sedimentation method for settling zinc using alkali and an ion-exchange method. However, the equipment cost and the operation cost therefor are high.

In recent years, it has become a social responsibility to reduce the amount of effluent water in order to minimize adverse effects on the environment. Since each of the water systems of a normal plant discharges blowdown, the amount of effluent water is large. Moreover, since purification equipment is required to process the effluent water, solid sludge containing iron, zinc, or the like is produced, which is a problem. In some cases, processes to remove lead, hexavalent chromium, or the like or to reduce the biochemical oxygen demand (BOD) or the chemical oxygen demand (COD) may be necessary.

Moreover, when raw water is used as the spray water for cooling effluent gas, the consumption of water increases, thereby increasing the operating cost, which is a problem.

SUMMARY OF THE INVENTION

An object of the present invention is to reduce the amount of effluent water from a plant system comprising a heating furnace to substantially zero. According to this method, purification equipment is no longer necessary, and thus no solid sludge from the purification equipment is produced. Moreover, iron and zinc can be collected as fly ash, which is easy to collect, treat, and recycle. the heating furnace so as to vaporize the blowdown water.

Preferably, the heating furnace is a movable hearth furnace for reducing metal oxide.

The blowdown water may be a direct-cooling water containing floating substances at a concentration of 20 mg/L or more, and the direct-cooling water may be sprayed into the effluent gas inside a cooling tower of the manufacturing equipment.

The manufacturing equipment may further include two or more cooling towers. The blowdown water that is used in the cooling tower disposed at the upstream side closest to the heating furnace may be a direct-cooling water containing floating substances at a concentration of 20 mg/L or more. The blowdown water that is used in the cooling tower disposed at the downstream side farthest from the heating furnace may be a water containing floating substances at a concentration of less than 20 mg/L.

DESCRIPTION OF THE PREFERRED EMBODIMENTS

Figure 1:
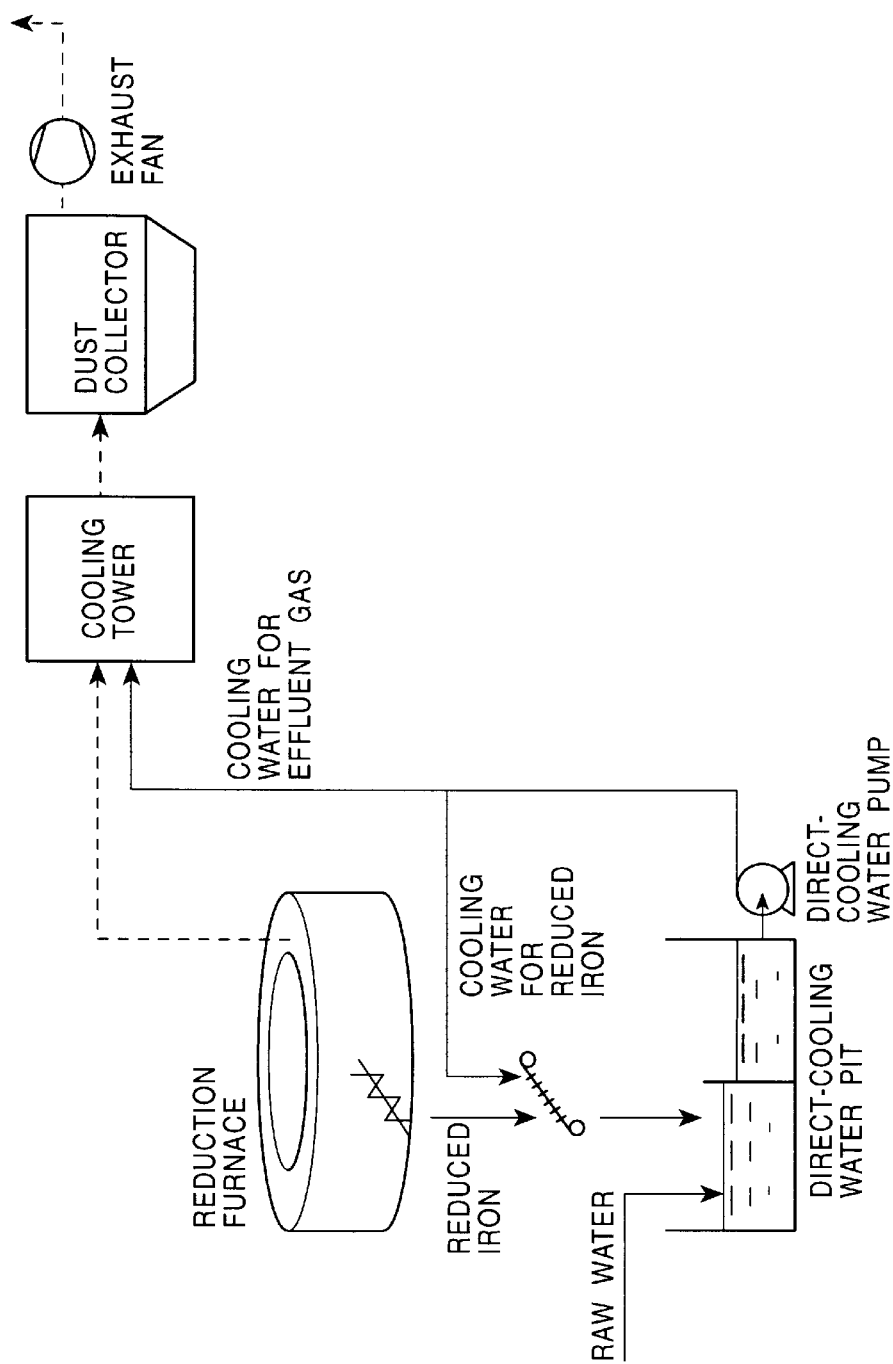
FIG. 1 is a schematic illustration for explaining a method for operating a manufacturing plant including a heating furnace according to a first embodiment of the present invention.

The preferred embodiments of the present invention will now be described.

A method for operating manufacturing equipment including a heating furnace comprises the step of spraying blowdown water of water used in the manufacturing equipment into effluent gas discharged from the heating furnace so as to vaporize the blowdown water and remove solid dust contained in the effluent gas.

According to the above-described method for operating the manufacturing equipment including a heating furnace, discharging of effluent water from the plant system is no longer necessary, i.e., the amount of effluent water can be decreased to nearly zero. Thus, no purification equipment is needed, and no solid sludge from the purification equipment is produced. Solid substances such as iron and zinc which have been conventionally collected by the purification equipment are collected as fly ash using a cooling tower of an effluent gas system of the heating furnace. The floating substances in the blowdown water collide with the solid dust in the effluent gas, thereby reducing the kinetic energy of the solid dust and increasing the dust-collecting efficiency of the cooling tower disposed at the downstream of the heating furnace.

Preferably, the heating furnace used in the above-described method is a movable hearth furnace for reducing metal oxide. Since direct-cooling water used in the movable hearth furnace and the related equipment contains a large amount of metal or compounds thereof processed in the movable hearth furnace, the efficiency of dust collection can be improved by using this direct-cooling water. Moreover, the composition of the dust flying in the exhaust gas from the movable hearth furnace is substantially the same as the composition of the floating substances in the direct-cooling water, because the direct-cooling water contains metals or compounds thereof processed in the movable hearth furnace. Accordingly, the composition of the dust collected from the effluent gas remains the same, and no additional equipment for processing fly ash is necessary. Moreover, when the effluent water contains zinc, zinc can be recovered without an additional process for removing zinc from the effluent water.

Preferably, the blowdown water is a direct-cooling water having a floating substance concentration of 20 mg/L or more, and the direct-cooling water is sprayed into the effluent gas inside a cooling tower. The floating substances in the direct-cooling water collide with the solid dust in the effluent gas and thus reduce the kinetic energy of the solid dust, thereby improving the efficiency of the dust collection. As a result, a simple dust collection method such as a gravitational dust collection method, an inertial dust collection method, or a centrifugal dust collection method can be employed. The concentration of zinc or the like in the dust collected by a bag filter disposed at the downstream of the cooling tower can also be increased.

In the method of the present invention, two or more cooling towers may be used to spray water to the effluent gas. A direct-cooling water having a floating substance concentration of 20 mg/L or more is preferably used in the cooling tower disposed at the upstream side closest to the heating furnace. Water having a floating substance concentration of less than 20 mg/L is preferably used in the cooling tower disposed at the downstream side farthest from the heating furnace. This method increases the efficiency of dust collection. In particular, since the effluent gas in the upstream-side cooling tower contains a larger amount of dust, the, collision of the floating substances with the solid dust occurs at a high probability, thereby increasing the efficiency of the dust collection. When water having a floating substance concentration of less than 20 mg/L is used in the downstream-side cooling tower, clogging of the nozzles for spraying water can be prevented.

When a plurality of cooling towers in which cooling water is sprayed is installed at a plurality of positions of different gas temperatures in the effluent gas system, a blowdown water containing a large amount of floating substances is preferably supplied to only the cooling tower for cooling gas having the highest temperature, and a blowdown water containing a small amount of floating substances is preferably supplied to the cooling tower for cooling gas having a relatively low temperature. The reason for this arrangement is because the particle size of the water used when cooling effluent gas having a low temperature must be small in order to completely vaporize the water particles. Accordingly, the diameter of the nozzles and pipes used in the cooling tower located at a position which the effluent gas has a low temperature must be small, and such pipes and nozzles easily clog by generation of scale. By using the water having a high floating substance content in a cooling tower for cooling gas having a high temperature and by using the water having a low floating substance content in a cooling tower for cooling gas having a low temperature, the problems such as pipe clogging can be prevented.

When both a process water having a high floating substance concentration and a water having a low floating substance concentration are used in the same cooling tower and the temperature of the gas is controlled by using these waters, the control of the temperature is preferably performed by adjusting the amount of the water having a low floating substance concentration. If the amount of a water having a high floating substance concentration, i.e., SS of 20 mg/L or more, is adjusted to control the temperature, generation of scale and wearing of pipes may occur. The flow rate of the water having a high floating substance concentration should be maintained at a constant level to avoid pipe troubles.

First Embodiment

FIG. 1 is a schematic illustration for explaining a method for operating a plant including a heating furnace according to a first embodiment of the present invention. In this embodiment, the present invention is applied to a reduction furnace, i.e., a rotary hearth furnace, for making reduced iron. The first embodiment of the present invention is described in detail below.

In this embodiment, reduced iron made using a reduction furnace, i.e., a rotary hearth furnace, is directly cooled using water. Since water used for water-sealing the reduction furnace comes into direct contact with part of the stock and the product, this water is also treated as the direct-cooling water. In this embodiment, the floating substance concentration in the direct-cooling water is 180 mg/L and the iron concentration in the direct-cooling water is 60 mg/L.

Effluent gas from the reduction furnace is fed to a cooling tower. Direct-cooling water, i.e., the blowdown water used to cool the reduced iron made in the reduction furnace and the blowdown water used to water-seal the reduction furnace, is also introduced to the cooling tower. The direct-cooling water is then sprayed into the effluent gas inside the cooling tower so as to vaporize the direct-cooling water.

The effluent gas is cooled and tempered inside the cooling tower. Meanwhile, the solid contents of the effluent gas are removed by means of inertial dust collection and is collected by a dust collector disposed at the downstream of the cooling tower.

Effluent gas from a reduction furnace using steel mill waste contains a solid component such as iron and a component, such as zinc, that solidifies when the component is cooled and reacted with other components after evaporating inside the furnace. In this embodiment, these solid components are removed by means of inertial dust collection inside the cooling tower. Alternatively, these solid components may be removed by gravitational dust collection or centrifugal dust collection.

The dust collector at the downstream of the cooling tower uses a bag filter to remove zinc and the like. Alternatively, a scrubber or an electrical dust collector may be used instead of the bag filter.

The floating substances contained in the direct-cooling water can be separated from the gas and collected by inertial dust collection inside the cooling tower. During this process, the floating substances collide with the solid dust in the effluent gas, thereby decreasing the kinetic energy of the solid dust and increasing the efficiency of collecting solid dust.

The dust collected using the bag filter disposed at the downstream of the cooling tower is used as a raw material for zinc smelting. Since the efficiency of collecting solid dust is enhanced as described above, the dust collected using the bag filter has a high zinc concentration.

In this embodiment, direct-cooling water having a floating substance concentration of 180 mg/L and an iron content of 60 mg/L was sprayed inside a cooling tower. Approximately 4.2 tons of dust a week was collected in the cooling tower, and approximately 46.5 tons of dust a week was collected by the bag filter. In contrast, when raw water was fed inside the cooling tower, approximately 3.5 tons of dust a week was collected in the cooling tower, and approximately 46.9 tons of dust a week was collected by the bag filter. When the direct-cooling water was sprayed, approximately 300 kg of dust was collected as solid dust. The composition of the dust did not differ substantially from when the direct-cooling water was used to when the raw water was used.

Second Embodiment

Figure 2:
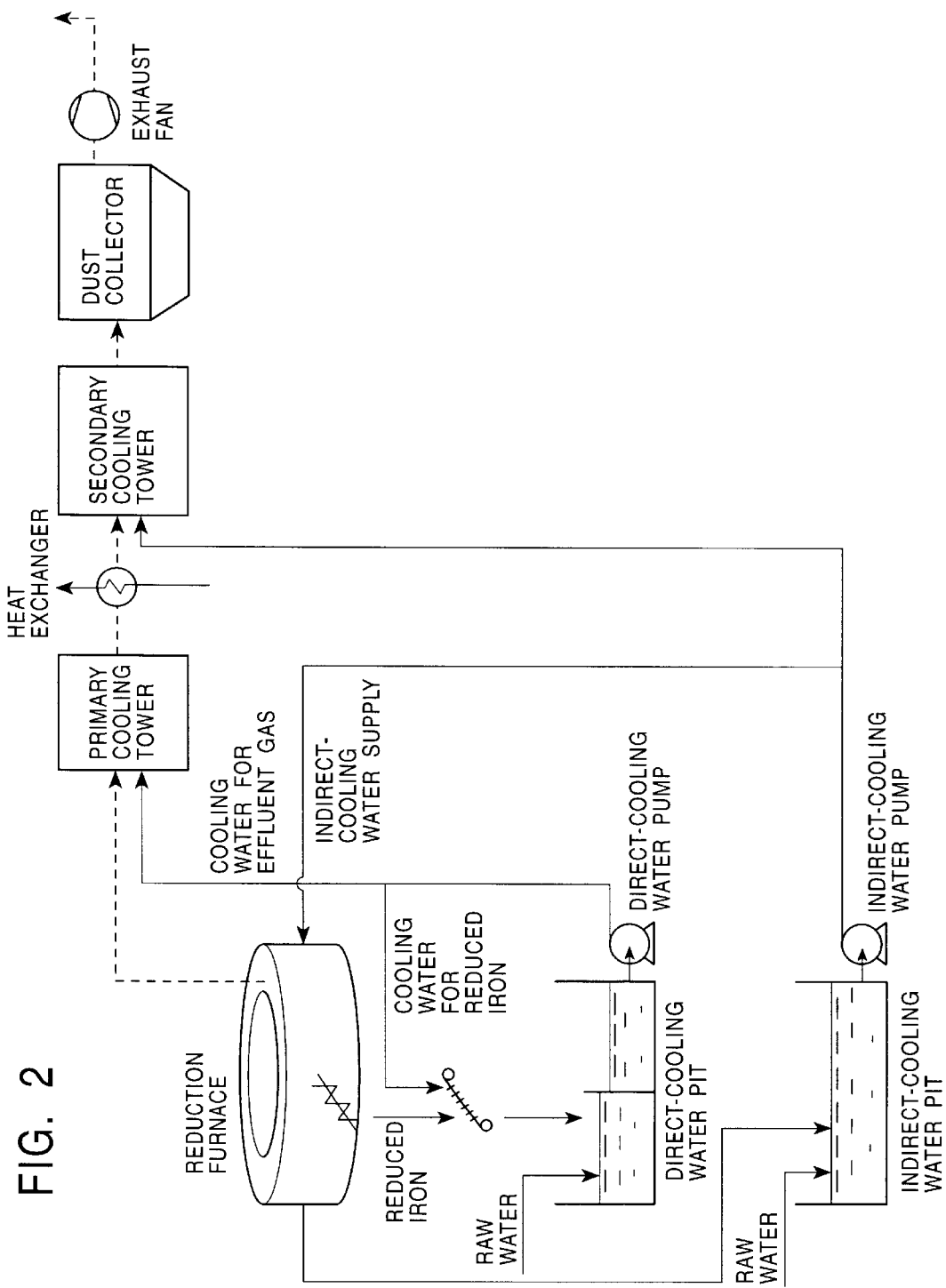
FIG. 2 is a schematic illustration for explaining a method for operating a manufacturing plant including a heating furnace according to a second embodiment of the present invention.

FIG. 2 is a schematic illustration for explaining a method for operating a manufacturing plant including a heating furnace according to a second embodiment of the present invention. In the second embodiment, a waste heat recovery system is added to the exhaust gas equipment of the first embodiment. The details are described below.

In this embodiment, a heat exchanger is disposed at the downstream of the cooling tower (primary cooling tower), and another cooling tower (secondary cooling tower) is disposed at the downstream of the heat exchanger so as to control the temperature before the bag filter (dust collector). In this embodiment, blowdown water of indirect-cooling water is used in the secondary cooling tower disposed at the downstream of the heat exchanger. The reason for such an arrangement is described below.

The temperature of gas in the secondary cooling tower is lower than that in the primary cooling tower, and is approximately 150 to 350° C. at the outlet thereof. In order to completely vaporize water particles without significantly increasing the size of the cooling tower, the size of the water particles must be small. Accordingly, the secondary cooling tower must use spray nozzles capable of generating finer spray compared with that in the primary cooling tower. When water, such as direct-cooling water, having a high floating substance concentration is used in the secondary cooling tower, the nozzles and pipes may be clogged. In order to avoid such a problem, indirect-cooling water having a low floating substance content is used in the secondary cooling tower. Note that the exit temperature of the primary cooling tower is 350 to 600° C. The floating substance content in the indirect-cooling water sprayed in the second cooling tower is 10 mg/L, which is significantly lower than that in the direct-cooling water.

Third Embodiment

Figure 3:
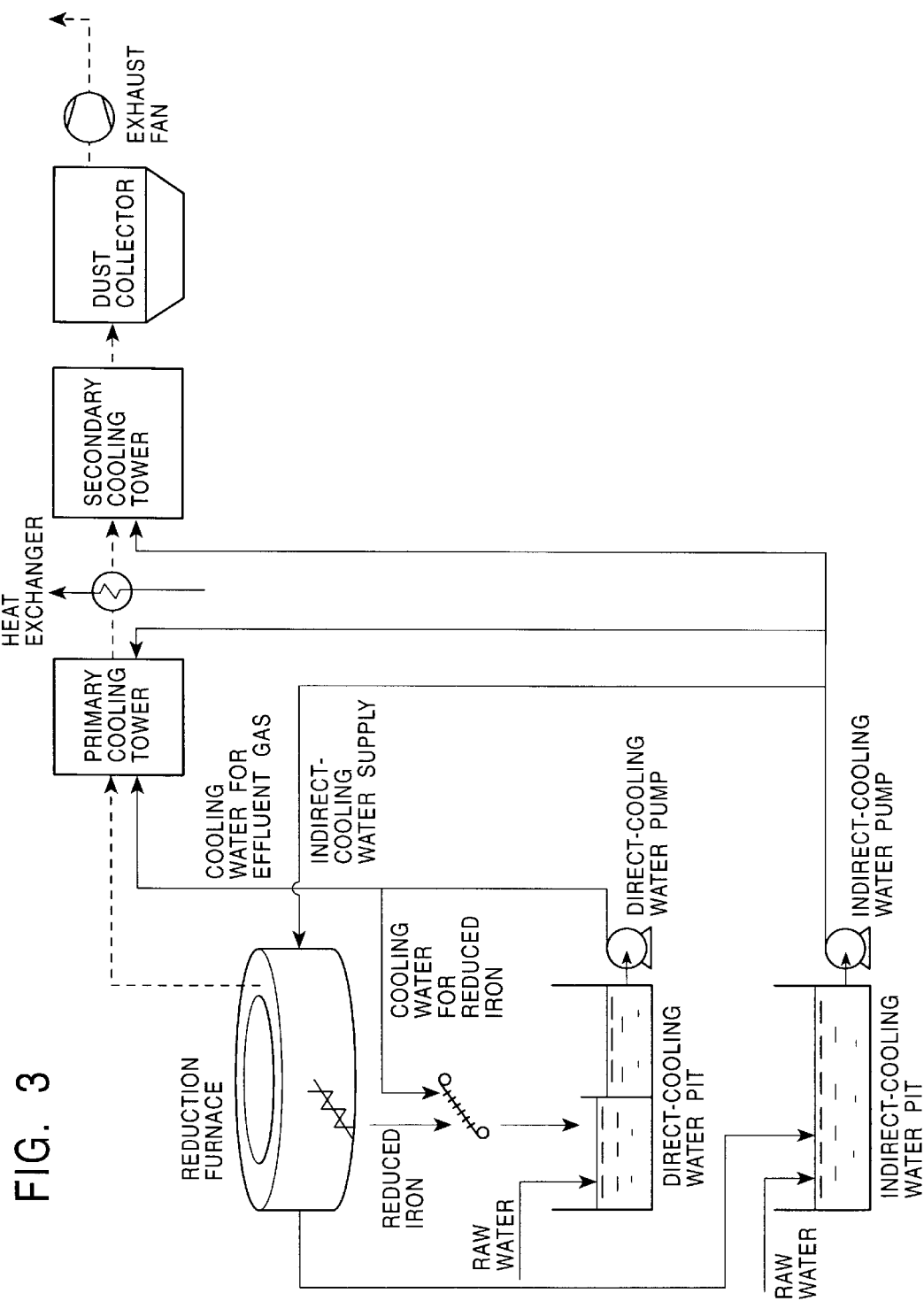
FIG. 3 is a schematic illustration for explaining a method for operating a manufacturing plant including a heating furnace according to a third embodiment of the present invention.
Figure 4:
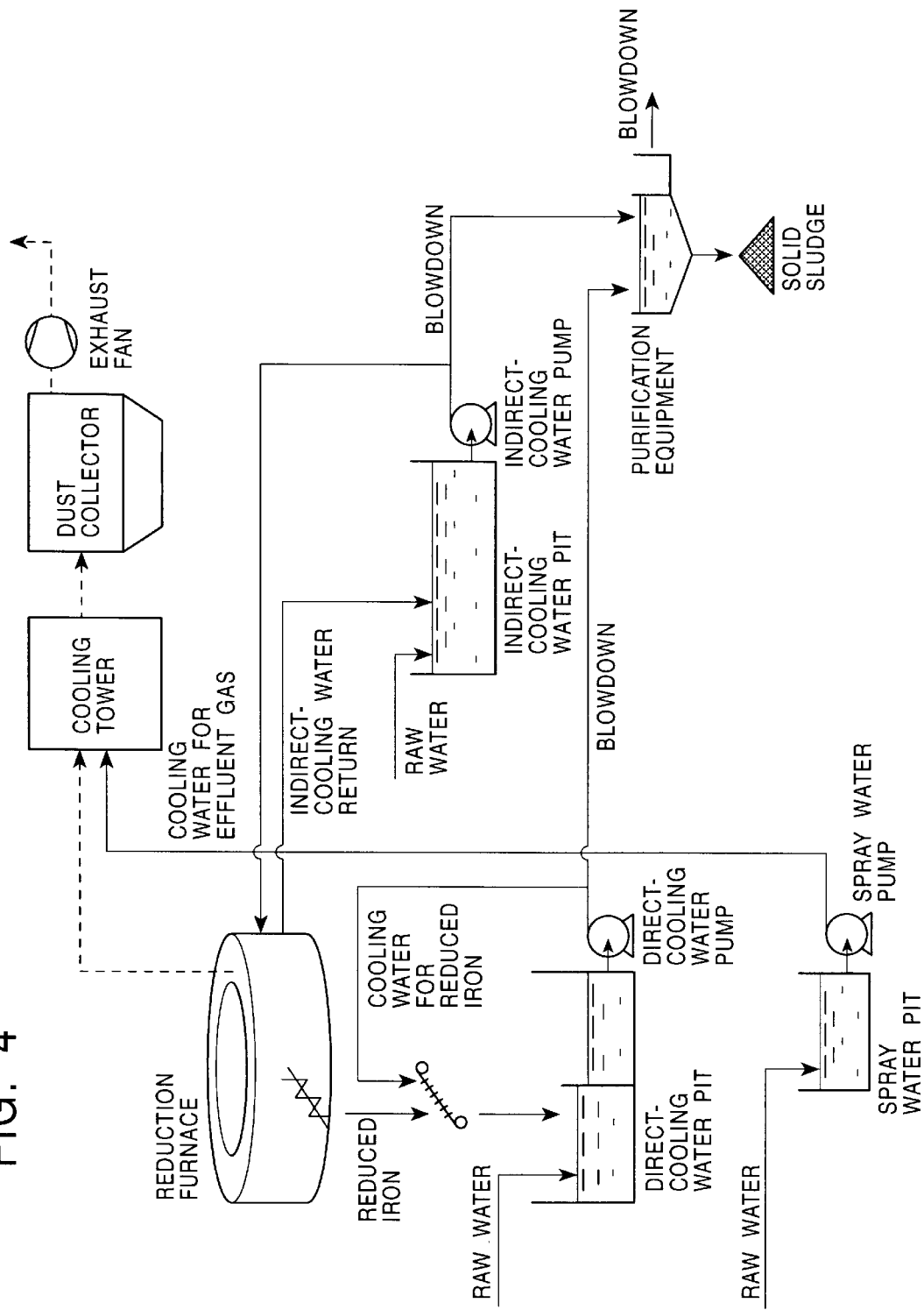
FIG. 4 is a schematic illustration for explaining a method for operating a manufacturing plant including a heating furnace according to a known technology.

FIG. 3 is a schematic illustration for explaining a method for operating a manufacturing plant including a heating furnace according to a third embodiment of the present invention. In the third embodiment, both direct-cooling water and indirect-cooling water are used in the primary cooling tower described in the second embodiment. The details of the third embodiment are described below.

The temperature inside the cooling tower is controlled by adjusting the amount of sprayed water. However, when the supply of the direct-cooling water having a high floating substance concentration is decreased to adjust the temperature, the flow rate inside the pipe becomes low, thereby causing accumulation of scale inside the pipe. In contrast, when the supply is increased, the flow rate inside the pipe becomes high, thereby promoting wear of the pipe. In this embodiment, the temperature of the exhaust gas is controlled by adjusting the amount of the indirect-cooling water supplied to the primary cooling tower while maintaining the amount of the direct-cooling water supplied to the primary cooling tower at a constant level. In this method, the supply of the direct-cooling water can be maintained at a constant level, and accumulation of scale and wear of the pipe can be avoided.

In all of the embodiments above, in order to perform nozzle cleaning without having any downtime, preferably, the number of the nozzles through which the direct-cooling water is sprayed is more than required so as to allow switching of the operating nozzles, or a by-pass pipe may be installed in the piping system.

What is claimed is:

1. A method for operating manufacturing equipment including a heating furnace, the method comprising:
   spraying a blowdown water that has been in the manufacturing equipment into effluent gas discharged from the heating furnace so as to vaporize the blowdown water.

2. A method according to claim 1, wherein the heating furnace is a movable hearth furnace for reducing metal oxide.

3. A method according to claim 1, wherein the blowdown water is a direct-cooling water containing floating substances at a concentration of 20 mg/L or more, and the direct-cooling water is sprayed into the effluent gas inside a cooling tower of the manufacturing equipment.

4. A method according to claim 1, wherein the manufacturing equipment further includes two or more cooling towers,
   wherein the blowdown water that is used in the cooling tower disposed at the upstream-side closest to the heating furnace is a direct-cooling water containing floating substances at a concentration of 20 mg/L or more, and the blowdown water that is used in the cooling tower disposed at the downstream-side farthest from the heating furnace is a water containing floating substances at a concentration of less than 20 mg/L.

5. A method for operating a heating furnace, comprising the steps of:
   operating the furnace to reduce a metal oxide;
   discharging an effluent gas from the heating furnace;
   using a liquid coolant to cool at least one of the furnace, the metal oxide and a product derived from the reduced metal oxide; and
   feeding the liquid coolant into the effluent gas to cool the effluent gas and vaporize the liquid coolant.

6. The method according to claim 5, further comprising a further step of collecting solid contents of the cooled effluent gas.

* * * * *